United States Patent

Minchev et al.

[11] 4,375,270
[45] Mar. 1, 1983

[54] APPARATUS FOR SOLDERING THE WINDING TO THE COMMUTATOR OF AN ELECTRIC MACHINE

[75] Inventors: Pavel M. Minchev; Hristomir D. Hristov; Stoimen S. Balinov, all of Sofia; Nikolay V. Yordanov, Village Lozen, all of Bulgaria

[73] Assignee: Institute Po Metaloznanie I Technologia NA Metalite, Sofia, Bulgaria

[21] Appl. No.: 226,383

[22] Filed: Jan. 19, 1981

[30] Foreign Application Priority Data

Jan. 18, 1980 [BE] Belgium ................................. 46283

[51] Int. Cl.³ .............................................. B23K 37/06
[52] U.S. Cl. ......................................... 228/37; 228/39
[58] Field of Search .................. 228/56 A, 37, 39, 33, 228/260; 29/597, 598

[56] References Cited

U.S. PATENT DOCUMENTS 2,264,703  12/1941  Lenz ....................................... 228/39
3,196,829  7/1965  Elliott et al. ........................... 228/37
3,713,876  1/1973  Lavric ................................... 228/37

FOREIGN PATENT DOCUMENTS 538904  11/1931  Fed. Rep. of Germany ........ 228/37

Primary Examiner—Nicholas P. Godici
Assistant Examiner—M. Jordan

[57] ABSTRACT

Apparatus for soldering the winding of armatures of electrical machines to the collectors thereof. The apparatus includes a device for gripping, displacing and fixing the armature with the collector, a single-phase magnetic-hydrodynamic pump with metal conduit and a bath with molten solder and heaters. The magnetic core of the single-phase magnetic-hydrodynamic pump is embraced by a metal conduit disposed underneath the bottom of the bath, and the inlet of the metal conduit is connected to the bottom of the bath, while its outlet end is rigidly connected to a casing fastened to the bottom of the bath. To the bottom of the casing there is pressed by means of an easily releasable joint a changeable nozzle unit. When it is necessary to solder a collector with a diameter different from the previous one, the changeable nozzle unit is taken out of the apparatus and new one of a size corresponding to that of the collector to be soldered is inserted in the apparatus.

6 Claims, 1 Drawing Figure

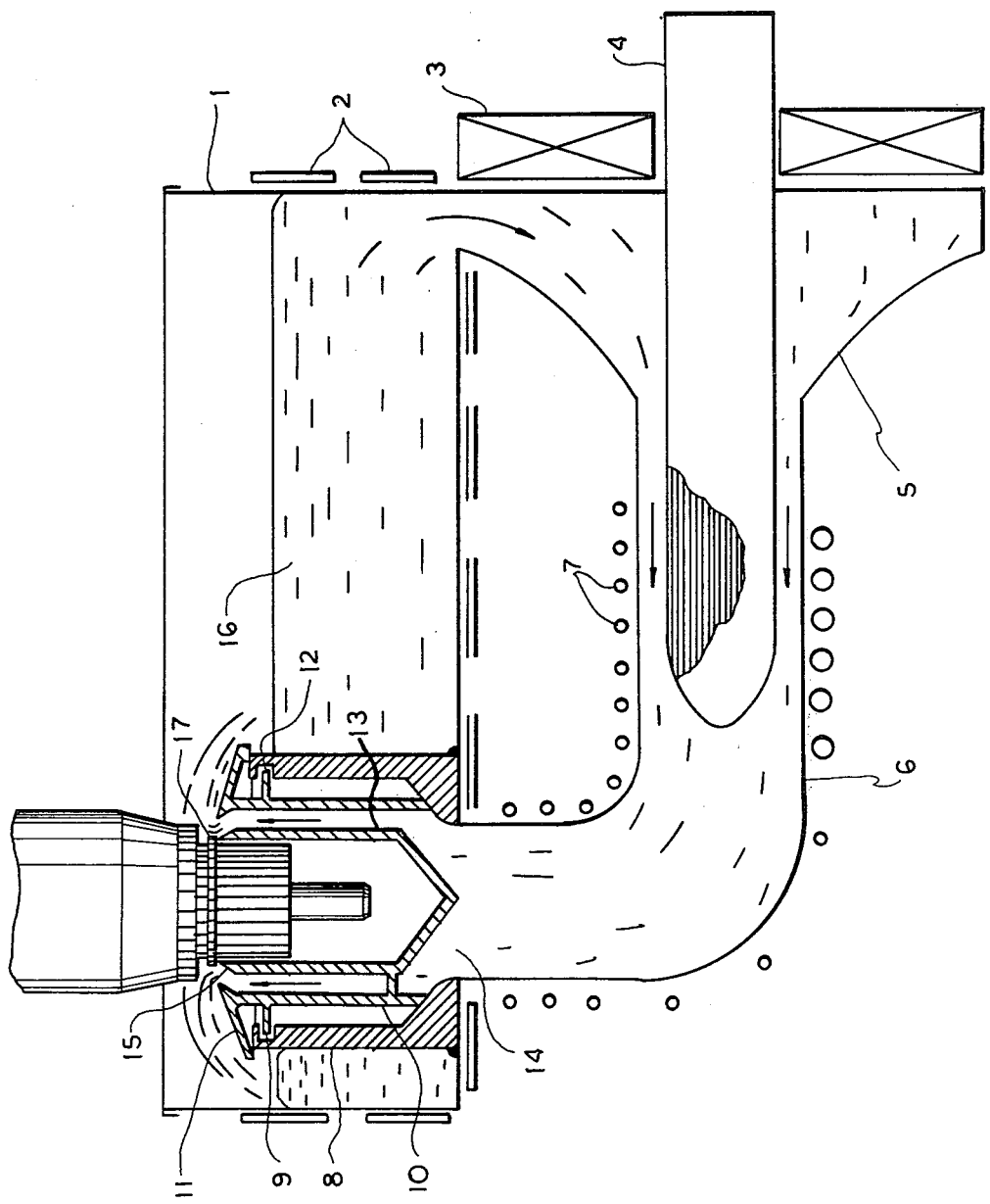

APPARATUS FOR SOLDERING THE WINDING TO THE COMMUTATOR OF AN ELECTRIC MACHINE

This application is related to the application of Minchev et al, Ser. No. 164,001, filed June 30, 1980, now U.S. Pat. No. 4,331,279.

This invention relates to an apparatus for soldering the wires of the armature winding to the commutator of electric machines.

In the above cited Minchev et al U.S. Pat. No. 4,331,279 there is disclosed an apparatus for soldering the winding to the commutator of an electric machine, which comprises a device for gripping, displacing and fixing the armature to the commutator, a bath with molten solder, a single-phase magnetic-hydrodynamic pump with a conduit for molten metal which is chamfered in its upper portion, arranged concentrically around a hollow cylindrical magnetic core, and heaters. The soldering of the ends of the wires of the winding with the commutator plates is effected simultaneously by a flow of molten solder formed by the ring-shaped groove which is chamfered in the upper portion of the magnetic core of the magnetic-hydrodynamic pump.

This known apparatus can be used for soldering the winding to commutators of a given diameter. This justifies its use in the medium and large-lot production of commutator-type electric machines. However, this apparatus has not found wide application in small-lot production, as well as in the repair of electric machines with commutators of different diameters.

It is, therefore, a general object of this invention to provide a versatile apparatus for the soldering of the winding to the commutators of electric machines with collectors of different diameters which is featured by a high productivity at comparatively low energy consumption.

This object is achieved by an apparatus for soldering the winding to the commutator of electric machines, which comprises a device for gripping, displacing and fixing the armature with the commutator, a single-phase magnetic-hydrodynamic pump with a metal conduit, and a bath with molten solder and heaters. The magnetic core of the single-phase magnetic-hydrodynamic pump is embraced by a metal conduit disposed underneath the bath. The inlet end of the metal conduit is connected to the bottom of the bath, while its outlet end is connected by means of an elbow with heaters to a casing which is rigidly fastened to the bottom of the bath. This casing is a hollow cylinder with a conical bottom and a central hole. To the bottom of the casing there is pressed by means of an easily releasable joint a changeable nozzle unit, which comprises an external cylindrical component which is a hollow cylinder, the upper end of the inner surface of which is chamfered at a given angle with respect to its axis commutator and ends with a cover, covering the casing, and an internal cylindrical component which is a hollow cylinder with conical bottom. The upper end of the outer surface of the internal cylindrical component of the changeable nozzle unit is chamfered and is parallel to the chamfered upper end of the inner surface of the external cylindrical component of the changeable nozzle unit. The internal and the external cylindrical components of the changeable nozzle unit are rigidly fastened one to another. The bottom conical part of the casing and the bottom conical end of the internal cylindrical component of the changeable nozzle unit form a confusor or jet, while the upper chamfered end of the external cylindrical component and the upper chamfered end of the internal cylindrical component of the changeable nozzle unit form a ring-shaped groove, which is inclined towards the axis of the changeable nozzle unit.

In a preferred embodiment of the apparatus of the invention the metal conduit has a horizontal section inside which there is disposed the magnetic core of the single-phase magnetic-hydrodynamic pump.

It is advantageous for the end of the magnetic conduit which is inside the metal conduit to be of streamlined shape.

In accordance with the invention the cover of the external cylindrical component of the changeable nozzle unit is inclined with respect to its axis.

In a variant of the apparatus the easily releasable joint is made as a bayonet-type joint.

It is also appropriate that the inlet end of the metal conduit is of gradually narrowing shape.

The advantages of the apparatus of this invention, as compared to the aforedescribed known design, lie in the possibility of soldering commutators of different diameters; this is achieved by the use of a set of changeable nozzle units, corresponding to the respective diameters of the commutators, with only one apparatus having a high productivity as a result of the simultaneous soldering of all the collector leads or tongues. The apparatus is characterized by its small sizes its comparatively low energy consumption, and an initial preparation time for work of only a short duration.

For a better understanding of the invention, reference should be made to the accompanying drawing in which:

The single FIGURE is a view partially in vertical cross-section and partially in elevation of the apparatus in working position.

It is seen in the drawing that surrounding molten metal bath 1 there are electric resistance heaters 2, and entirely outside the bath there is arranged a single-phase magnetic-hydrodynamic pump with a winding 3 and a magnetic core 4, which is embraced concentrically by a metal conduit 5 which disposed underneath the bath 1. The upper, inlet end of the metal conduit 5 is connected to the bottom of the bath 1, while its lower, outlet end is connected by means of an elbow 6 with electric resistance heaters 7 to a casing 8 which is rigidly fastened to the bottom of the bath 1. This casing 8 is a hollow cylinder with a conical bottom and a central hole. To the bottom of the casing 8 there is pressed by means of an easily releasable joint 9, made-up as a bayonet joint, a changeable nozzle unit 10. This changeable nozzle unit 10 comprises an external cylindrical component 11 which is a hollow cylinder the upper radially inner end of the inner surface of which is chamfered or inclined with respect to its axis 10, and ends with a cover, covering the casing 8. The changeable nozzle unit 10 has an internal cylindrical component 13 which is a hollow cylinder with downwardly covering conical bottom. The upper end of the outer surface of the internal cylindrical component 13 of the changeable nozzle unit 10 is chamfered or inclined and is parallel to the chamfered upper end of the inner surface of the external cylindrical component 11 of the changeable nozzle unit 10.

The internal cylindrical component 13 and the external cylindrical component 11 of the changeable nozzle unit 10 are coaxial and are rigidly fastened one to another by means of fixed joints which for the sake of simplicity are not shown in the drawing. The bottom conical part of the casing 8 and the bottom conical part of the internal cylindrical component 13 of the changeable nozzle unit 10 form a jet or confusor 14. The upper chamfered end of the external cylindrical component 11 and the chamfered end of the internal cylindrical component 13 of the changeable nozzle unit 10 form a ring-shaped groove 15 which is inclined with respect to the axis of the changeable nozzle unit 10. The bath 1 is charged with molten solder 16. The commutator 12 is provided with an annular flange or step 17 which supports the commutator by its engagement with component 13.

The operation of the apparatus of this invention is as follows:

The initial melting of the solder within the bath 1 and the elbow 6 is effected by the electric resistance heaters 2 and 7, respectively, and in the metal conduit 5 by the thermal energy released by the single-phase magnetic hydrodynamic pump 3. When the single-phase magnetic hydrodynamic pump 3 is switched-off, by means of a device for gripping, displacing and fixing (which for simplicity is not shown in the drawing), the rotor with commutator 12 is placed vertically in the hollow space within the internal cylindrical component 13 of the changeable nozzle unit 10 until it comes into working position. The single-phase magnetic-hydrodynamic pump 3 is then switched-on. The molten solder 16 is sucked from the bottom of bath 1, passes through the metal conduit 5, the elbow 6, the jet or confusor 14, flows out through the ring-shaped groove or channel 15, washes simultaneously all tongues of the commutator 12, penetrates into the channels of the collector plates, and solder the wires of the winding to the commutator 12, while the excess solder is returned to the bath 1. After the termination of the process of soldering the single-phase magnetic-hydrodynamic pump 3 is switched off and the rotor removed from the apparatus. The placement of the next rotor into position, initiates the next working cycle.

By means of the step 17, as shown in the drawing, there is effected a sealing of the commutator 12 to the internal cylindrical component 13 of the changeable nozzle unit 10.

As a result of the streamlined shape of the magnetic core 4, the suitably chosen angles of inclination or chamfer of the bottom conical part of casing 8, and the bottom conical end of the internal cylindrical component 13 of the changeable nozzle unit 10, and the gradually narrowing shape of the inlet end of the metal conduit 5, there is provided a minimum hydrodynamic resistance in the path of the flow of molten solder.

The angle of inclination of the ring-shaped channel 15 is determined by the requirement for directing the flow of molten solder in the direction of the channels of the commutator plates of the rotor.

By a suitable choice of the inclination of the cover of the external cylindrical component 11 of the changeable nozzle unit 10 the splashing of the solders are eliminated and the cooling, and the oxidation of the molten solder is also reduced.

In cases when it is necessary to solder a commutator with a diameter different from the previous one, the changeable nozzle unit 10 is taken out and a new one with sizes of the internal cylindrical component 13 corresponding to the diameter of the soldered commutator is inserted. Then the aforedescribed working cycle is repeated.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. In an apparatus for soldering the windings of electric machines to the commutators therefor having a single-phase magnetic-hydrodynamic pump with metal conduit and a bath with molten solder and heaters, the improvement wherein the magnetic core of the single-phase magnetic-hydrodynamic pump is embraced by a generally horizontal metal conduit disposed underneath and spaced from the bottom of the bath, and the inlet of the metal conduit is connected to the bottom of the bath, while its outlet end is rigidly connected by means of a generally vertically disposed elbow with heaters to the bottom of the bath.

2. An apparatus for soldering the winding to the collectors of electric machines according to claim 1, wherein the inlet end of the metal conduit is of gradually narrowing shape.

3. In an apparatus for soldering the windings of electric machines to the commutators therefor having a single-phase magnetic-hydrodynamic pump with metal conduit and a bath with molten solder and heaters, the improvement wherein the magnetic core of the single-phase magnetic-hydrodynamic pump is embraced by a metal conduit disposed underneath the bottom of the bath, and the inlet of the metal conduit is connected to the bottom of the bath, while its outlet end is rigidly connected by means of an elbow with heaters to a casing fastened to the bottom of the bath, the casing being a hollow cylinder with conical bottom and a central hole, to the bottom of the casing there being attached by means of an easily releasable joint a changeable nozzle comprising an external cylindrical component which is a hollow cylinder, the upper end of the inner surface of which is chamfered with respect to the axis of the changeable nozzle unit and ends with a cover covering the case, and an internal cylindrical component of the changeable nozzle unit is chamfered and is parallel to the chamfered upper end of the internal surface of the external cylindrical component of the changeable nozzle unit.

4. Apparatus according to claim 3, wherein the internal cylindrical component and the external cylindrical component of the changeable nozzle unit are rigidly fastened one to another, and the bottom conical part of the casing and the bottom conical end of the internal cylindrical component of the changeable nozzle unit form a jet, while the upper chamfered end of the external cylindrical component and the upper chamfered end of the internal cylindrical component of the changeable nozzle unit form a ring-shaped groove which is inclined with respect to the axis of the changeable nozzle unit.

5. An apparatus for soldering the winding to the collectors of electric machines according to claim 4, wherein the easily releasable joint is of the bayonet type.

6. An apparatus for soldering the winding to the collectors of electric machines according to claim 4, wherein the cover of the external cylindrical component of the changeable nozzle unit is inclined with respect to its axis.

* * * * *